United States Patent
Kuboki

(10) Patent No.: US 8,071,229 B2
(45) Date of Patent: Dec. 6, 2011

(54) PERPENDICULAR MAGNETIC RECORDING MEDIA AND PERPENDICULAR MAGNETIC RECORDING APPARATUS

(75) Inventor: Yoshiyuki Kuboki, Matsumoto (JP)

(73) Assignee: Fuji Electric Co., Ltd. (JP)

( * ) Notice: Subject to any disclaimer, the term of this patent is extended or adjusted under 35 U.S.C. 154(b) by 0 days.

(21) Appl. No.: 12/168,124

(22) Filed: Jul. 5, 2008

(65) Prior Publication Data
US 2009/0015967 A1 Jan. 15, 2009

(30) Foreign Application Priority Data
Jul. 5, 2007 (JP) ................. 2007-177251

(51) Int. Cl.
*G11B 5/66* (2006.01)

(52) U.S. Cl. ......... 428/831; 428/827; 428/828; 428/829

(58) Field of Classification Search ........ 428/827–848.9
See application file for complete search history.

(56) References Cited

U.S. PATENT DOCUMENTS

| | | | |
|---|---|---|---|
| 4,722,869 A | | 2/1988 | Honda et al. |
| 6,432,563 B1 * | | 8/2002 | Zou et al. .................. 428/826 |
| 6,682,826 B2 | | 1/2004 | Shimizu et al. |
| 2003/0091868 A1 | | 5/2003 | Shimizu et al. |
| 2005/0153169 A1 * | | 7/2005 | Watanabe et al. ...... 428/694 BM |
| 2006/0228587 A1 * | | 10/2006 | Kuboki ..................... 428/829 |
| 2007/0237986 A1 * | | 10/2007 | Wu et al. ................. 428/831.2 |

FOREIGN PATENT DOCUMENTS

| | | |
|---|---|---|
| JP | 56-070618 A | 6/1981 |
| JP | 62-006426 A | 1/1987 |
| JP | 2001-283428 A | 10/2001 |
| JP | 2002-352408 A | 12/2002 |
| JP | 2003-123245 A | 4/2003 |
| JP | 2004-220680 A | 8/2004 |
| JP | 2005-190506 A | 7/2005 |

OTHER PUBLICATIONS

T. Oikawa et al.; "Microstructure and Magnetic Properties of CoPtCr-SiO2 Perpendicular Recording Media"; IEEE Transactions on Magnetics; Sep. 2002; pp. 1976-1978; vol. 38, No. 5.

(Continued)

*Primary Examiner* — Holly Rickman
*Assistant Examiner* — Linda Chau
(74) *Attorney, Agent, or Firm* — Rossi, Kimms & McDowell LLP

(57) ABSTRACT

A perpendicular magnetic recording media is disclosed which employs inexpensive materials in the intermediate layer of the high-recording density media while exhibiting magnetic characteristics comparable or superior to those of media using Ru or Re. A perpendicular magnetic recording apparatus employing this perpendicular magnetic recording media also is disclosed. The perpendicular magnetic recording media has a nonmagnetic substrate, a soft magnetic backing layer formed on the nonmagnetic substrate, a seed layer formed on the soft magnetic backing layer, an intermediate layer formed on the seed layer, a magnetic layer formed on the intermediate layer, and a protective layer formed on the magnetic layer. The intermediate layer comprises an alloy with the hcp structure containing 55 at % or more Zn, the magnetic layer comprises an alloy with the hcp structure containing Co, and the $\Delta\theta 50$ value of the orientation plane (0002) of the magnetic layer is between 1.5° and 4°.

9 Claims, 1 Drawing Sheet

OTHER PUBLICATIONS

Australian Patent Office, Written Report for Application No. SG 200603320-1 filed Apr. 30, 2008, mailed Jul. 21, 2009.

Australian Patent Office, Search Report for Application No. SG 200603320-1 filed Apr. 30, 2008, mailed Jul. 21, 2009.

Notification of Reasons for Refusal issued in corresponding Japanese Patent Application No. 2007-177251 dated Nov. 5, 2010. Partial English translation provided.

* cited by examiner

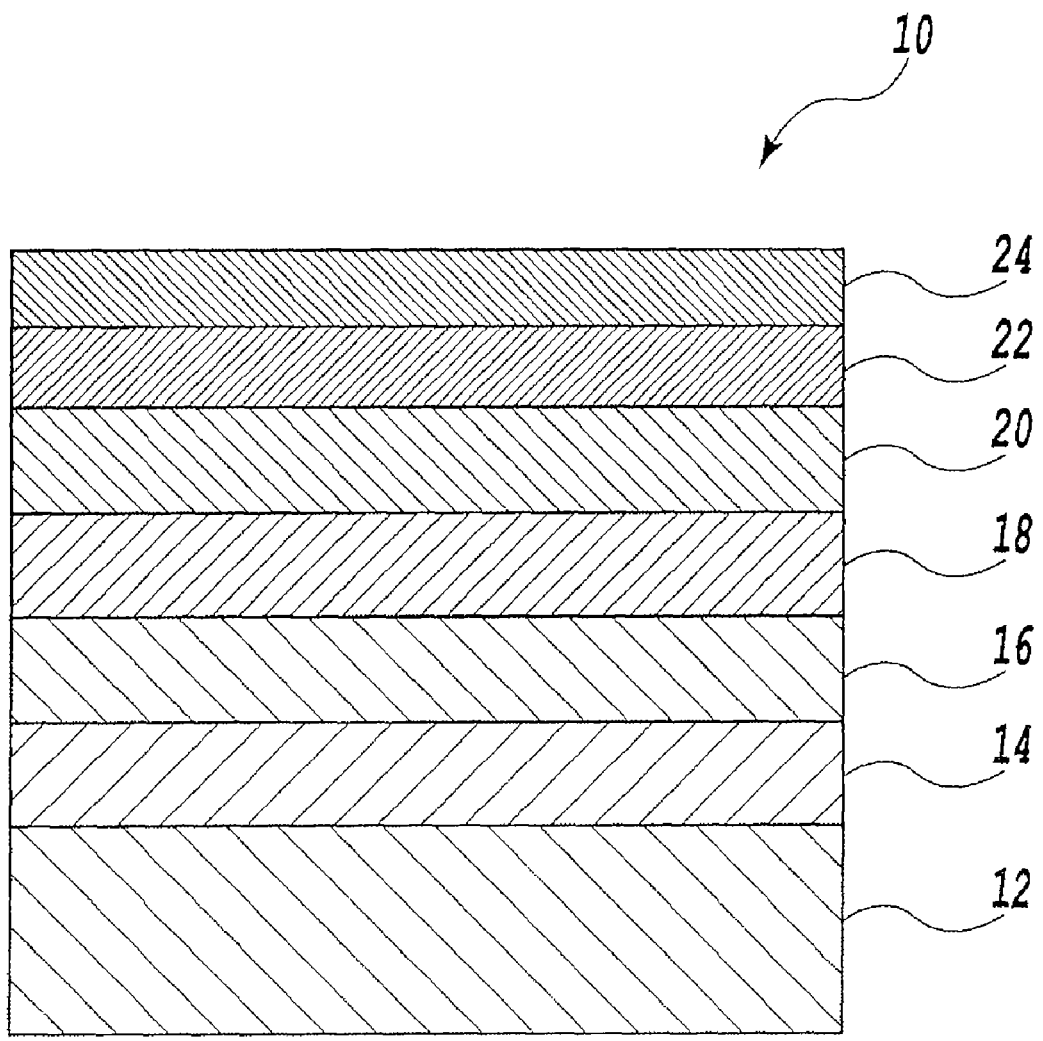

PERPENDICULAR MAGNETIC RECORDING MEDIA AND PERPENDICULAR MAGNETIC RECORDING APPARATUS

CROSS REFERENCE TO RELATED APPLICATIONS

This application claims priority from Japanese application Serial No. 2007-177251, filed on Jul. 5, 2007. The disclosure of the priority application, in its entirety, including the drawings, claims, and the specification thereof, is incorporated herein by reference.

BACKGROUND OF THE INVENTION

A. Field of the Invention

This invention relates to perpendicular magnetic recording media. More specifically, this invention relates to perpendicular magnetic recording media which is inexpensive and has excellent magnetic characteristics. This invention also relates to a perpendicular magnetic recording apparatus comprising such perpendicular magnetic recording media.

B. Description of the Related Art

Perpendicular magnetic recording media generally have a structure in which a substrate, backing layer, seed layer, intermediate layer, magnetic layer, and protective layer are deposited in order. Given such a structure, various research and development is being performed relating not only to the magnetic layer, but also to the intermediate layer positioned immediately below this magnetic layer, in order to improve the various characteristics desired of perpendicular magnetic recording media, such as the magnetic characteristics and the read/write characteristics.

For example, when using an alloy the principal component of which is Co as the magnetic layer, efforts are being made to use various materials in the intermediate layer in order to control the crystal orientation, crystal grain diameters, segregation structure, and similar of the magnetic layer. In representative cases, Ru or an alloy of Ru is used as the intermediate layer material, and the following technologies have been disclosed for such magnetic recording media.

In T. Oikawa, M. Nakamura, H. Uwazumi, T. Shimatsu, and H. Muraoka, members IEEE, and Y. Nakamura, fellow, IEEE: *IEEE Transactions on Magnetics*, Vol. 38, No. 5, September 2002, perpendicular magnetic recording media are disclosed in which a magnetic layer with $SiO_2$ added to Co alloy (CoPtCr) is grown epitaxially on a Ru underlayer (intermediate layer).

In Japanese Patent Laid-open No. 2001-283428, perpendicular magnetic recording media are disclosed in which the magnetic film comprises an alloy, the main component of which is Co, and the intermediate layer is an alloy, the main components of which are Ru and a material having a body-centered cubic structure, which comprises 60 at % or higher Ru.

Thus in the technologies disclosed in the report of T. Oikawa et al. and in Japanese Patent Laid-open No. 2001-283428, Ru is used in the intermediate layer positioned directly below the magnetic layer (film). Ru is an extremely expensive material, but until now there has been almost no material appropriate for use in an intermediate layer, the magnetic characteristics of which have surpassed those of Ru or a Ru alloy. Hence the manufacturing cost of intermediate-layer materials in perpendicular magnetic recording media has been high.

Re is known as a substitute material for Ru in intermediate layers, but the cost of the intermediate-layer material also remains high when Re is used, and so there has been a need to develop technology for application of inexpensive materials in intermediate layers in place of Ru and Re.

In light of these circumstances, the following has been disclosed as specific technology for formation of an intermediate layer without using Ru or Re.

Japanese Patent Laid-open No. 2003-123245, corresponding to U.S. Pat. No. 6,682,826, discloses magnetic recording media, employing, as an orientation control film equivalent to an intermediate layer, Ge, Cu, Ni, Au, Pd, or similar, as substitutes in addition to cases in which Ru or Re is used, and in which the difference between $\Delta\theta 50$ for the intermediate layer and the magnetic layer is within a specified range (from 1 to 8 degrees). Formation of crystal grain boundaries in the initial magnetic layer growth period is promoted by means of this media, and magnetic characteristics can be improved.

However, when Ru or Re is not used in the intermediate layer, if the magnetic layer thickness is reduced in order to increase the recording density, orientation of the intermediate layer and magnetic layer declines as a result, and media noise is increased. Hence there has been a need to develop magnetic recording media for high-density recording which employs inexpensive materials yet exhibits magnetic characteristics comparable to or surpassing those achieved using Ru or Re.

As described above, various perpendicular magnetic recording media have been disclosed, but there remain demands for perpendicular magnetic recording media which exhibit excellent high-density recording and other magnetic characteristics, while employing an intermediate layer formed by inexpensive means. The present invention is directed to overcoming or at least reducing the effects of one or more of the problems set forth above.

SUMMARY OF THE INVENTION

Hence an object of the invention is to provide perpendicular magnetic recording media which, while employing an inexpensive material in the intermediate layer of the high-recording-density media, is capable of exhibiting magnetic characteristics comparable to or exceeding those when using Ru or Re. In addition, an object of the invention is to provide a perpendicular magnetic recording apparatus comprising such perpendicular magnetic recording media.

The present invention relates to perpendicular magnetic recording media, comprising a nonmagnetic substrate, a soft magnetic backing layer formed on the nonmagnetic substrate, a seed layer formed on the soft magnetic backing layer, an intermediate layer formed on the seed layer, a magnetic layer formed on the intermediate layer, and a protective layer formed on the magnetic layer, in which the intermediate layer comprises an alloy with the hcp structure containing 55 at % or more Zn, and in which the magnetic layer comprises an alloy with the hcp structure containing Co and has a $\Delta\theta 50$ value for the orientation plane (0002) of between 1.5° and 4°. Perpendicular magnetic recording media of this invention may be used in various perpendicular magnetic recording apparatus. It is desirable that the intermediate layer of perpendicular magnetic recording media of this invention further comprise at least one element selected from the element group consisting of Ta, Mo, Mg, Au, Ti, Ag, Dy, Nb, Zr, Cr, V, B, and Si. It is further desirable that the fractional content of the above element group be from 10 to 45 at %, and extremely desirable that the magnetic layer have a granular structure. Further, the nonmagnetic substrate can be fabricated from a material comprising any among aluminum, glass, and silicon.

The invention further includes a perpendicular magnetic recording apparatus comprising the above perpendicular magnetic recording media.

By comprising 55 at % or more inexpensive Zn in the intermediate layer, perpendicular magnetic recording media of this invention enable cost reduction for the intermediate layer, and so a reduction in the cost of the perpendicular magnetic recording media as a whole.

In perpendicular magnetic recording media of this invention, the intermediate layer comprises an alloy with the hcp structure containing 55 at % or more Zn, and the magnetic layer comprises an alloy with the hcp structure containing Co, and with a Δθ50 value for the orientation plane (0002) of between 1.5° and 4°, so that disorder of crystal orientation during the initial growth phase of the magnetic layer can be suppressed, and media noise can be reduced.

Moreover, when the intermediate layer comprises at least one element selected from the element group consisting of Ta, Mo, Mg, Au, Ti, Ag, Dy, Nb, Zr, Cr, V, B, and Si, crystal grain diameters can be made fine and grain diameters can be made uniform in the magnetic layer, and media noise can be further reduced.

A perpendicular magnetic recording apparatus of this invention comprises perpendicular magnetic recording media having the above characteristics, and so is suitable for use as various kinds of recording apparatus.

BRIEF DESCRIPTION OF THE DRAWINGS

The foregoing advantages and features of the invention will become apparent upon reference to the following detailed description and the accompanying drawing figure which is a schematic cross-sectional diagram showing an example of perpendicular magnetic recording media of the invention.

DETAILED DESCRIPTION OF SPECIFIC EMBODIMENTS

As a result of diligent studies regarding elements which can replace Ru to provide satisfactory magnetic characteristics for the intermediate layer of perpendicular magnetic recording media, the present inventor has discovered that satisfactory magnetic characteristics depend on the atomic radius of Ru, and in turn on Ru lattice constants. Therefore, the inventor focused in Zn as an inexpensive material having an atomic radius comparable to that of the expensive Ru. Through this process, the inventor found that by adopting a material comprising an alloy with the hcp structure containing 55 at % or more inexpensive Zn as the intermediate layer, and by adopting a material comprising an alloy with the hcp structure containing Co, and having a Δθ50 value for the orientation plane (0002) of the magnetic layer of 1.5° to 4° as the magnetic layer, perpendicular magnetic recording media can be manufactured with low costs overall. By suppressing disordering of the crystal orientation during the initial growth phase of the magnetic layer, media noise can be reduced, and consequently excellent high-density recording and other magnetic characteristics can be realized without using Ru or similar in the intermediate layer. Below, preferred aspects of the invention are explained, referring to the FIGURE. The examples described below are merely illustrative, and various appropriate design modifications can be made by a practitioner of the art within the scope of normal creative abilities.

Perpendicular Magnetic Recording Media

The sole FIGURE of drawing is a schematic cross-sectional view showing an example of perpendicular magnetic recording media of the invention. As shown in the figure, perpendicular magnetic recording media 10 comprises nonmagnetic substrate 12, soft magnetic backing layer 14 formed on nonmagnetic substrate 12, seed layer 16 formed on soft magnetic backing layer 14, intermediate layer 18 formed on seed layer 16, magnetic layer 20 formed on intermediate layer 18, protective layer 22, formed on magnetic layer 20, and lubricating layer 24 formed on protective layer 22.

A material used in the substrates of ordinary magnetic recording media can be employed for nonmagnetic substrate 12, which can comprise any among aluminum, glass, and silicon. As material comprising aluminum, an Al alloy with NiP plating can be used. As a glass material, reinforced glass, crystallized glass, and similar can be used. And as a material comprising silicon, a silicon substrate, or a silicon carbide substrate, can be used. The thickness of nonmagnetic substrate 12 is adjusted according to the size of the substrate, with a thickness in the range 0.3 to 1.3 mm being desirable.

Soft magnetic backing layer 14 is a layer which serves to suppress spreading of magnetic flux from the head at the time of recording and to secure a sufficient magnetic field in the perpendicular direction. As the material of soft magnetic backing layer 14, a Ni alloy, Fe alloy, or Co alloy can be used. For example, satisfactory electromagnetic conversion characteristics can be obtained by using amorphous CoZrNb, CoTaZr, CoTaZrNb, CoFeNb, CoFeZrNb, CoFeTaZrNb, or a similar material. It is preferable that the thickness of soft magnetic backing layer 14 be set in the range of 10 to 100 nm in consideration of the structures of magnetic heads used when recording as well as productivity. The advantageous result of suppressing the spreading of magnetic flux is obtained by setting the film thickness to 10 nm or greater, and excellent productivity can be realized by setting the film thickness to 100 nm or less.

Seed layer 16 serves to control the orientation properties and grain diameters in intermediate layer 18 formed thereupon, as well as those of magnetic layer 20. To this end, it is preferable that a material having the fcc structure or hcp structure be used in seed layer 16. For example, NiFeAl, NiFeSi, NiFeNb, NiFeB, NiFeNbB, NiFeMo, NiFeCr, CoNiFe, CoNiFeB, and similar materials can be used. It is preferable that the film thickness of seed layer 16 be adjusted appropriately such that the magnetic characteristics and electromagnetic conversion characteristics of resulting magnetic layer 20 are desired values, within the range of 2 to 20 nm. Degradation of the orientation properties of intermediate layer 18 and also of magnetic layer 20 is suppressed by making the film thickness 2 nm or greater, and the grain diameters in seed layer 16 can be kept from becoming excessively large by making the film thickness 20 nm or less, and by this means grain diameters in intermediate layer 18 and magnetic layer 20 can be made fine, and degradation of the electromagnetic conversion characteristics can be suppressed.

Intermediate layer 18 is a nonmagnetic layer which, through improved orientation and smaller grain diameters of intermediate layer 18 itself, acts to improve the orientation properties and reduce the grain diameters in magnetic layer 20 that is formed on it and, with respect to magnetic characteristics, acts to suppress the occurrence of an undesired initial phase layer of magnetic layer 20. Intermediate layer 18 is formed from an alloy material with the hcp structure, containing 55 at % Zn alloy.

Here, in order to satisfactory maintain the crystal orientation of intermediate layer 18 in the (0002) direction which is equivalent to perpendicular orientation, it is preferable that at least one element selected from the element group consisting of Ta, Mo, Mg, Au, Ti, Ag, Dy, Nb, Zr, Cr, V, B, and Si be included, in addition to Zn.

If the Ta or other elements described above, which have atomic radii different from the Zn atoms which make up most of intermediate layer 18, exist in excess, then the desired lattice constant for intermediate layer 18 is not obtained, and consequently disordering in the crystal orientation during the initial growth phase of magnetic layer 20 cannot be suppressed. The atomic radii of the elements belonging to the above element group are larger than 0.133 nm, which is the atomic radius of Zn. Hence, as elements to control the lattice constant, it is preferable to add Cr and/or V, which have smaller atomic radii than Zn. The atomic radius of Cr is 0.125 nm, which is somewhat smaller than 0.133 nm, the atomic radius of V. Hence Cr and V serve as elements which modify the lattice constant, so to speak, bringing the lattice constant which is increased due to addition of Ta and similar closer to the lattice constant for the case of Zn itself. By this means, the lattice constant a can be set in the range of 0.2665 to 0.2800 nm, while selecting a composition enabling appropriate control of magnetic characteristics using elements which would not be appropriate with respect to the lattice constant. For the above reasons, it is preferable that the total concentration of the above elements combined with Zn be within the range of 10 to 45 at %. By this means, the lattice constant a of intermediate layer 18 can be controlled within the range of 0.2665 to 0.2800 nm, and disordering of the crystal orientation during the initial growth phase of magnetic layer 20 can be suppressed. In this way, perpendicular orientation can be realized in intermediate layer 18 which is comparable or superior to that achieved when using Ru (intermediate layer lattice constant a=0.2705 nm), and consequently media noise can be reduced.

Preferred elements for addition to reduce grain diameters in intermediate layer 18 include B, Si, and Nb. It is preferable that the total concentration of these elements be in the range 10 to 45 at %. By this means, finer grain structure in intermediate layer 18 gives rise to finer crystal grains in the recording layer, so that recording density characteristics are improved.

Further, in order to suppress the formation of an initial layer in magnetic layer 20, it is preferable that the film thickness of intermediate layer 18 be 2 nm or greater, so as to obtain satisfactory crystallinity in intermediate layer 18. By this means, degradation of the orientation of the intermediate layer 18 can be suppressed, and excellent orientation and crystal grain isolation in the magnetic layer 20 can be attained. Also, by setting the film thickness of intermediate layer to 20 nm or less, grain diameters can be kept from becoming too large in intermediate layer 18, and as a result growth of grain diameters in magnetic layer 20 can also be suppressed. Through such control of the film thickness of intermediate layer 18, media noise can be reduced while realizing high recording densities.

Magnetic layer 20 is the layer provided for recording and reproduction of information. In order to use magnetic layer 20 as a portion of the perpendicular magnetic recording media, the magnetization easy axis must be oriented in the direction perpendicular to the substrate plane. To this end, magnetic layer 20 is oriented with the hcp (0002) plane parallel to the substrate plane. Further, magnetic layer 20 comprises an alloy containing Co and having the hcp structure, the $\Delta\theta50$ value of the orientation plane (0002) of which is between 1.5° and 4°. Excellent read/write characteristics are achieved b making the $\Delta\theta50$ value equal to or greater than 1.5°, and declines in the noise characteristic arising due to reduced orientation as the thickness is reduced can be suppressed by making the value 40 or less.

Here, the $\Delta\theta50$ value is an index of the distribution of the crystal plane inclination of magnetic layer 20, and more specifically, is called the peak half-maximum width of the so-called rocking curve with respect to a certain orientation plane at the surface of magnetic layer 20. The smaller the value of $\Delta\theta50$, the better the crystal orientation of magnetic layer 20.

The following is an example of a method of measurement of $\Delta\theta50$ for the (0002) orientation plane at the surface of magnetic layer 20. First, when determining the peak position, the media on the surface side of which magnetic layer 20 is formed is irradiated with X-rays, and the diffracted X-rays are detected by a diffracted X-ray detector. The position of the detector is set such that the angle of incident X-rays with respect to the diffracted X-rays detected by the detector (the angle made by diffracted X-rays with a line extended from the incident X-rays) is twice the incidence angle $\theta$ of the incident X-rays on the media surface, that is, $2\theta$. When irradiating the media with the incident X-rays, by changing the orientation of the media, the incidence angle $\theta$ of incident X-rays is changed, and the position of the detector is also changed accordingly such that the angle made by diffracted X-rays with the incident X-rays is $2\theta$ (that is, twice the incidence angle $\theta$ of the incident X-rays), and the intensity of diffracted X-rays is measured using the detector, in what is called the $\theta$-$2\theta$ scan method. By this means, the relation between the intensity of diffracted X-rays and the incidence angle $\theta$ is investigated, and the detector position at which the intensity of diffracted X-rays is greatest is determined. The angle $2\theta$ made by diffracted X-rays at this detector position with the incident X-rays is called $2\theta p$. The angle $2\theta p$ thus obtained can be used to determine the dominant crystal plane at the surface of magnetic layer 20.

Next, when determining the rocking curve, with the detector fixed at the position at which the angle $2\theta$ of the diffracted X-rays is $2\theta p$, the media orientation is changed to change the incidence angle $\theta$ of incident X-rays, and a rocking curve is created indicating the relation between the incidence angle $\theta$ and the intensity of diffracted X-rays detected by the detector. The detector position is fixed at the position at which the diffracted X-ray angle $2\theta$ is $2\theta p$, so that the rocking curve represents the distribution of the inclination of the crystal plane at the surface of the magnetic layer 20 with respect to the plane of the media. In this way, $\Delta\theta50$ is determined as the half-maximum width of the peak indicating the orientation plane in the rocking curve.

Magnetic layer 20 can be made to comprise at least one element selected from the element group consisting of Pt, Cr, Si, and O. In particular, a preferable structure is one in which ferromagnetic crystal grains of an alloy comprising Co are surrounded by nonmagnetic crystal grains the main component of which is an oxide, that is, a so-called granular structure. Because a granular structure is a structure in which the magnetic grains of the alloy comprising Co are isolated from each other by the oxide, the fine magnetic grains exist independently as a result, and therefore high recording density levels can be achieved. Here, "main component" means that other components may be contained in small amounts, and in particular that the oxide comprises approximately 90 mol % or more of the nonmagnetic crystal grains.

In the above granular structure, CoPtCr, CoPt, CoPtSi, CoPtCrB, and other CoPt-base alloys, as well as CoCr, CoCrTa, CoCrTaPt, and other CoCr-base alloys can be used as the alloy comprising Co forming the ferromagnetic crystal grains in magnetic layer 20. Among these, CoPt-base alloys enable a high crystal magnetic anisotropy (Ku) and so are especially preferable.

In the above granular structure, $SiO_2$, $Cr_2O_3$, $ZrO_2$, $TiO_2$, or $Al_2O_3$, which have excellent magnetic isolation properties with respect to the above ferromagnetic crystal grains, can be used as the oxide forming the nonmagnetic grains in magnetic layer 20. Among these, $SiO_2$ has superior magnetic isolation properties and is especially preferable.

In the above granular structure, it is preferable that the average grain diameter of crystal grains be from 4 to 8 nm. While depending on the composition, by setting the average grain diameter to 4 nm or greater, thermal stability can be secured. And noise can be reduced by setting the average grain diameter to 8 nm or less.

It is preferable that the film thickness of magnetic layer 20 be in the range of 8 to 20 nm. Thermal stability is degraded when the film thickness is less than 8 nm. Further, the head magnetic field does not reach the entire magnetic film when the thickness is greater than 20 nm, and write characteristics are degraded.

Protective layer 22 is a layer formed for the purpose of preventing corrosion of magnetic layer 20, and preventing damage to magnetic layer 20 in the event of media contact with the magnetic head. As protective layer 22, a layer can be employed which mainly comprises materials normally used in such layers, such as for example C, $SiO_2$, or $ZrO_2$. It is preferable that the thickness of protective layer 22 be within the range of film thicknesses used in normal magnetic recording media, such as for example between 2 and 5 nm.

Lubricating layer 24 is a layer formed for the purpose of securing lubricating characteristics between the magnetic head and the media. As lubricating layer 24, materials normally used, such as for example perfluoro polyether, fluorinated alcohol, and fluorinated carboxylic acid lubricants, can be employed. The thickness of lubricating layer 24 can be set within the range of film thicknesses used in normal magnetic recording media, such as, for example, 0.5 to 2 nm.

Method of Manufacture of Perpendicular Magnetic Recording Media

Next, a method of manufacture of perpendicular magnetic recording media of this invention is explained, referring to the sole FIGURE of drawing above.

Cleaning of Nonmagnetic Substrate 12

Nonmagnetic substrate 12 is cleaned. In this cleaning, in addition to methods using prescribed reagents which are highly effective for removing natural oxide films, such as, for example, acid or alkaline solution cleaning, dry cleaning methods such as various plasma or ion cleaning methods can be used. In particular, it is preferable that a dry cleaning method be used from the standpoints of improving the precision of design dimensions, the need to eliminate liquids resulting from reagents used, and automation of the cleaning process.

Formation of Soft Magnetic Backing Layer 14

Cleaned nonmagnetic substrate 12 is introduced into a sputtering apparatus. A prescribed target is used with one of various sputtering methods to form soft magnetic backing layer 14. For example, the DC magnetron sputtering method can be used. Here, it is preferable that the atmosphere within the sputtering apparatus be an argon atmosphere, that the pressure within the apparatus be from 0.7 to 1.5 Pa, that no heating be performed within the apparatus, that the film deposition rate be from 2 to 10 nm/second, and that the distance between target and substrate be from 10 to 40 mm.

Formation of Seed Layer 16

One among various sputtering methods is used to form seed layer 16 on soft magnetic backing layer 14, using a prescribed target. For example, the DC magnetron sputtering method can be used. Here, it is preferable that the atmosphere within the sputtering apparatus be an argon atmosphere, that the pressure within the apparatus be from 0.7 to 2 Pa, that no heating be performed within the apparatus, that the film deposition rate be from 2 to 10 nm/second, and that the distance between target and substrate be from 10 to 40 mm.

Formation of Intermediate Layer 18

One among various sputtering methods is used to form intermediate layer 18 on seed layer 16, using a prescribed target. For example, the DC magnetron sputtering method can be used. Here, it is preferable that the atmosphere within the sputtering apparatus be an argon atmosphere, that the pressure within the apparatus be from 2.5 to 12 Pa, that no heating be performed within the apparatus, that the film deposition rate be from 2 to 10 nm/second, and that the distance between target and substrate be from 10 to 40 mm.

Formation of Magnetic Layer 20

One among various sputtering methods is used to form magnetic layer 20 on intermediate layer 18, using a prescribed target. For example, the DC magnetron sputtering method can be used. Here, it is preferable that the atmosphere within the sputtering apparatus be an argon atmosphere, that the pressure within the apparatus be from 0.7 to 4 Pa, that no heating be performed within the apparatus, that the film deposition rate be from 2 to 10 nm/second, and that the distance between target and substrate be from 10 to 40 mm.

Formation of Protective Layer 22

The layered member, in which soft magnetic backing layer 14, seed layer 16, intermediate layer 18, and magnetic layer 20 are formed in order on a nonmagnetic substrate 12, is transferred from the sputtering apparatus to a vacuum apparatus, and a CVD method can be used to form protective layer 22 on magnetic layer 20.

Other methods for forming protective layer 22 include a sputtering method using a carbon target, and an ion beam method. Well-known forms of these methods can be employed. In particular, when using a CVD method or an ion beam method, protective layer 22 can be made thin, so that higher recording densities can be achieved.

Formation of Lubricating Layer 24

Finally, the layered member on which protective layer 22 has been formed is removed from the vacuum apparatus, and a dipping method is used to form lubricating layer 24 on protective layer 22, to obtain perpendicular magnetic recording media of this invention.

Perpendicular Magnetic Recording Apparatus

By appropriately combining perpendicular magnetic recording media of this invention, obtained as described above, with other prescribed constituent members such as a magnetic head, voice coil motor, and control circuitry, a perpendicular magnetic recording device is obtained. Consideration must be paid to dust and dirt when assembling this device.

EMBODIMENTS

Below, embodiments of the invention are explained in still greater detail, demonstrating advantageous results of the invention.

Manufacture of Perpendicular Recording Media

Embodiment 1

As the nonmagnetic substrate, a chemically reinforced glass substrate (HOYA N-10 glass substrate), of diameter 65 mm and thickness 0.635 mm, was prepared. This was cleaned by an ultrasonic method, and after insertion into a sputtering apparatus, a Co-8Zr-5Nb (where numbers indicate the atomic percentage of the following element; here, a composition of 8 at % Zr, 5 at % Nb, remainder Co; similarly below) target was used to form a CoZrNb soft magnetic backing layer to a film thickness of 100 nm. Next, a Ni-12Fe-8B target was used to form a seed layer to a film thickness of 5 nm. Then, a Zn-33Ta-8Cr target was used to form an intermediate layer to a film thickness of 10 nm, under an Ar gas pressure of 5.0 Pa. Next, a 90 mol % (Co-8Cr-16Pt)-10 mol % $SiO_2$ target was used to form the magnetic layer to a film thickness of 15 nm, under an Ar pressure of 4.0 Pa. Following this the layered member was transferred to a vacuum apparatus, and a CVD method was used to form a carbon protective layer to a film thickness of 4 nm, after which the member was removed from the vacuum apparatus. Except for the carbon protective layer, this film deposition was all performed using the DC magnetron sputtering method. Then, a dipping method was used to form a liquid lubricating layer, of a perfluoro polyether, to a film thickness of 2 nm. In this way, perpendicular magnetic recording media was obtained.

Embodiment 2

Except for the fact that the target composition when forming the intermediate layer was Zn-12Cr-10Au-2Nb, the procedure of Embodiment 1 above was used to fabricate perpendicular magnetic recording media.

Embodiment 3

Except for the fact that the target composition when forming the intermediate layer was Zn-33Nb-8Cr, the procedure of Embodiment 1 above was used to fabricate perpendicular magnetic recording media.

Embodiment 4

Except for the fact that the target composition when forming the intermediate layer was Zn-17Dy-12V, the procedure of Embodiment 1 above was used to fabricate perpendicular magnetic recording media.

Embodiment 5

Except for the fact that a NiP-plated Al alloy substrate was used as the nonmagnetic substrate, the procedure of Embodiment 1 above was used to fabricate perpendicular magnetic recording media.

Comparison Example 1

Except for the fact that the target composition when forming the intermediate layer was Ru, the procedure of Embodiment 1 above was used to fabricate perpendicular magnetic recording media.

Comparison Example 2

Except for the fact that the target composition when forming the intermediate layer was Zn-40W-20Au, the procedure of Embodiment 1 above was used to fabricate perpendicular magnetic recording media.

Quantities for Evaluation

The perpendicular magnetic recording media of Embodiments 1 through 5 and Comparative Examples 1 and 2 were subjected to evaluations of the $\Delta\theta 50$ value, indicating the distribution of the slope of the magnetic layer crystal plane, the signal-to-noise ratio (hereafter "SNRm") of the media, the cost of the intermediate layer, and crystal grain diameters of the magnetic layers. As explained above, $\Delta\theta 50$ was determined as the half-maximum width of a peak indicating an orientation plane in a rocking curve. The cost of the intermediate layer was taken with reference to Comparison Example 2, where less expensive layers are indicated by O, and more expensive layers by x. The SNRm was evaluated by a method of writing signals using a single-pole head and reading signals using an MR head. S is the peak value for isolated-wave magnetization inversions at 716 kFCl, that is, the difference between the maximum and the minimum values, divided by two. Nm is the rms (root-mean-square) value at 60 kFCl.

Using a 500,000× photograph taken with a transmission electron microscope, the crystal grain diameters in the magnetic layer were measured by tracing the outlines of the crystal grains. The results of quantity evaluations appear in Table 1.

TABLE 1

|  | Intermediate layer target composition | Magnetic layer $\Delta\theta 50$ value (deg) | Intermediate layer cost | SNRm (dB) (evaluation quantity) | Magnetic layer grain diameter (nm) | Nonmagnetic substrate |
| --- | --- | --- | --- | --- | --- | --- |
| Embodiment 1 | Zn33Ta8Cr | 3.1 | o | 23.3 | 6.7 | Chemically reinforced glass |
| Embodiment 2 | Zn12Cr10Au2Nb | 2.9 | o | 23.6 | 6.2 | Chemically reinforced glass |
| Embodiment 3 | Zn33Nb8Cr | 2.7 | o | 23.8 | 5.8 | Chemically reinforced glass |
| Embodiment 4 | Zn17Dy12V | 3.8 | o | 22.8 | 6.5 | Chemically reinforced glass |
| Embodiment 5 | Zn33Ta8Cr | 3.2 | o | 23.2 | 6.8 | NiP-plated Al alloy |
| Comparison example 1 | Ru | 3.5 | x | 23.0 | 6.5 | Chemically reinforced glass |
| Comparison example 2 | Zn40W20Au | 4.2 | — | 22.5 | 7.2 | Chemically reinforced glass |

*In all of Embodiments 1 through 5 and Comparison Examples 1 and 2, the magnetic layer comprises an alloy with the hcp structure containing Co (within the scope of Claim 1 of the application). The units of numbers indicated before each element in the intermediate layer compositions are atomic percents.

According to Table 1, it is seen that excellent results are obtained for any one of Embodiments 1 through 5 which are within the scope of this invention, with a satisfactory balance between "cost of the intermediate layer" and "SNRm", which is an index of media noise. On the other hand, excellent results are not obtained for either of these quantities in the cases of Comparison Examples 1 and 2, which deviate from the scope of this invention.

More specifically, in Embodiment 1, in which an inexpensive Zn-33Ta-8Cr composition is used as the target composition for the intermediate layer, the $\Delta\theta 50$ value can be held lower compared with Comparison Example 1 in which expensive Ru is used as the intermediate layer target composition and with Comparison Example 2 in which Zn is not contained at 55 at % or greater in the intermediate target composition. Consequently, satisfactory results are also obtained for SNRm. It is thought that this is because 55 at % or greater Zn is used in the intermediate layer target composition, and the $\Delta\theta 50$ value of the magnetic layer is in the range 1.5° to 4°, so that disordering of the crystal orientation in the magnetic layer initial growth phase is suppressed, and consequently an excellent SNRm value is obtained, and noise is reduced.

In Embodiment 2, similarly to Embodiment 1, the $\Delta\theta 50$ value can be kept low compared with Comparison Examples 1 and 2, and by this means satisfactory results for the SNRm are obtained. Similarly to Embodiment 1, this is thought to be because disorder in crystal orientation in the initial growth phase of the magnetic layer is suppressed through a more appropriate intermediate layer target composition and a more appropriate value for $\Delta\theta 50$ for the magnetic layer, and as a result an excellent SNRm value is obtained, and noise is reduced.

Compared with Embodiment 1, in Embodiment 2 the $\Delta\theta 50$ value is 0.20 smaller, and grain diameters are 0.5 nm smaller, indicating further improvement with respect to $\Delta\theta 50$ and grain diameters. This is attributed to the fact that four elements are used as the target composition of the intermediate layer in Embodiment 2, so that reduction of the grain diameters in the intermediate layer is particularly promoted, and consequently the grain diameters in the magnetic layer are also smaller, so that an excellent SNRm was obtained.

Similarly to Embodiments 1 and 2, in Embodiment 3 also the $\Delta\theta 50$ value could be kept small compared with Comparison Examples 1 and 2, and by this means satisfactory results for SNRm also were obtained. Like Embodiments 1 and 2, this is thought to be because disordering of the crystal orientation in the magnetic layer initial growth phase was suppressed by means of an appropriate intermediate layer target composition and an appropriate $\Delta\theta 50$ value for the magnetic layer, so that consequently an excellent SNRm value was obtained, and noise could be reduced.

It is seen that compared with Embodiments 1 and 2, in Embodiment 3 the $\Delta\theta 50$ value is smaller still, and grain diameters are still smaller, so that there are further improvements with respect to both $\Delta\theta 50$ and grain diameters. This is attributed to the fact that a large amount of Nb was added to the intermediate layer in Embodiment 3, so that reduction of grain diameters in the intermediate layer was further promoted, and consequently grain sizes in the magnetic layer also were further reduced, so that an even better SNRm could be obtained.

In Embodiment 4, an $\Delta\theta 50$ value comparable to that of Comparison Example 1 was obtained without using Ru, resulting in a comparable SNRm value, and moreover comparable results were obtained for magnetic layer grain diameters as well. Further, in Embodiment 4 the $\Delta\theta 50$ value was kept low compared with Comparison Example 2, and by this means satisfactory results for SNRm were obtained. This is attributed to the fact that, through an appropriate intermediate layer target composition and an appropriate $\Delta\theta 50$ value for the magnetic layer, disordering of crystal orientation in the magnetic layer initial growth phase was suppressed, and consequently an excellent SNRm value was obtained and noise was reduced.

In Embodiment 5, results substantially the same as in Embodiment 1 were obtained, the $\Delta\theta 50$ value was kept low compared with Comparison Examples 1 and 2, and hence satisfactory results were obtained for SNRm also. This is attributed to the fact that, similarly to Embodiment 1, through an appropriate intermediate layer target composition and an appropriate $\Delta\theta 50$ value for the magnetic layer, disordering of crystal orientation in the magnetic layer initial growth phase was suppressed, and consequently an excellent SNRm value was obtained and noise was reduced.

In Embodiment 5, the nonmagnetic substrate was changed from the chemically reinforced glass of Embodiment 1 to an NiP-plated Al alloy; almost no change in the SNRm was seen compared with the chemically reinforced glass substrate.

Upon comparing Comparison Examples 1 and 2, it is seen that due to the degraded $\Delta\theta 50$ value of Comparison Example 2, a satisfactory result for SNRm is not obtained compared with Comparison Example 1. This is thought to be because the degraded $\Delta\theta 50$ resulted in a misfit between the intermediate layer and the magnetic layer. Moreover, crystal grain diameters are also worsened in Comparison Example 2 compared with Comparison Example 1. This is attributed to the inclusion of large quantities of W and other high-melting-point metals.

According to this invention, by including 55 at % or more inexpensive Zn in the intermediate layer, perpendicular magnetic recording media can be fabricated at low cost overall, and by fabricating the intermediate layer and magnetic layer with prescribed compositions and structures, as well as securing an orientation plane (0002) $\Delta\theta 50$ value of between 1.5° and 4° for the magnetic layer, disordering of crystal orientation in the initial growth phase of the magnetic layer can be suppressed, and media noise can be reduced. Hence this invention is promising for application to various inexpensive recording apparatuses, for which superior magnetic characteristics at high recording densities have been demanded in recent years.

Thus, a perpendicular magnetic recording media and perpendicular magnetic recording apparatus containing the media have been described according to the present invention. Many modifications and variations may be made to the techniques and structures described and illustrated herein without departing from the spirit and scope of the invention. Accordingly, it should be understood that the media and apparatus described herein are illustrative only and are not limiting upon the scope of the invention.

What is claimed is:

1. Perpendicular magnetic recording media, comprising:
   a nonmagnetic substrate;
   a soft magnetic backing layer formed on the nonmagnetic substrate;
   a seed layer formed on the soft magnetic backing layer;
   an intermediate layer comprising an alloy with the hcp structure containing 55 at % or more Zn formed on the seed layer, wherein the alloy comprises (i) Zn, (ii) an element with a smaller atomic radius than Zn, selected from the group consisting of Cr and V, and (iii) an element with an atomic radius larger than Zn, selected from the group consisting of Nb, Ta, Dy, and Mo;

a magnetic layer formed on the intermediate layer, the magnetic layer comprising an alloy with the hcp structure containing Co, and the $\Delta\theta 50$ value for the orientation plane (0002) of the magnetic layer is between 1.5° and 4°; and a protective layer formed on the magnetic layer.

2. The perpendicular magnetic recording media according to claim 1, wherein the magnetic layer comprises at least one element selected from the element group consisting of Pt, Cr, Si, and O.

3. The perpendicular magnetic recording media according to claim 2, wherein the magnetic layer has a granular structure.

4. The perpendicular magnetic recording media according to claim 1, wherein the nonmagnetic substrate comprise any one of aluminum, glass, and silicon.

5. The perpendicular magnetic recording media according to claim 1, wherein the seed layer has an fcc or hcp structure.

6. The perpendicular magnetic recording media according to claim 5, wherein thickness of the seed layer is 20 nm or less.

7. The perpendicular magnetic recording media according to claim 5, wherein the seed layer is selected from the group consisting of NiFeAl, NiFeSi, NiFeNb, NiFeB, NiFeNbB, NiFeMo, NiFeCr, CoNiFe, and CoNiFeB.

8. The perpendicular magnetic recording media according to claim 1, wherein thickness of the intermediate layer is 2 nm or greater.

9. The perpendicular magnetic recording media according to claim 1, comprising a seed layer with an fcc or hcp structure and a thickness of 20 nm or less and an intermediate layer with thickness of 2 nm or greater comprising at least one element selected from the element group consisting of B, Si, and Nb, wherein the total concentration of B, Si, and Nb is in the range of 10 to 45 at %.

* * * * *